US010688902B2

(12) United States Patent
Rexius et al.

(10) Patent No.: US 10,688,902 B2
(45) Date of Patent: Jun. 23, 2020

(54) TRUCK AND CONVEYOR SYSTEM

(71) Applicant: Conveyor Application Systems LLC, Eugene, OR (US)

(72) Inventors: Arlen Rexius, Eugene, OR (US); Jay Dee Werlinger, Brownsburg, IN (US); Brent Whitley, Fall Creek, OR (US); Jeremy Lee Oesterling, Greenfield, IN (US); David Looney, Monroe, OR (US); Matthew Charles Cox, Eugene, OR (US)

(73) Assignee: Conveyor Application Systems LLC, Eugene, OR (US)

( * ) Notice: Subject to any disclaimer, the term of this patent is extended or adjusted under 35 U.S.C. 154(b) by 146 days.

(21) Appl. No.: 15/911,004

(22) Filed: Mar. 2, 2018

(65) Prior Publication Data

US 2018/0251060 A1 Sep. 6, 2018

Related U.S. Application Data

(60) Provisional application No. 62/467,706, filed on Mar. 6, 2017.

(51) Int. Cl.
*B60P 1/36* (2006.01)
*B65G 41/00* (2006.01)

(52) U.S. Cl.
CPC .............. *B60P 1/36* (2013.01); *B65G 41/002* (2013.01)

(58) Field of Classification Search
CPC ................................. B60P 1/36; B65G 41/002
USPC ........................... 198/317, 318; 414/504, 523
See application file for complete search history.

(56) References Cited

U.S. PATENT DOCUMENTS

| 2,107,682 | A | * | 2/1938 | Wall | B60P 1/38 |
| | | | | | 414/504 |
| 3,863,783 | A | * | 2/1975 | Spellman, Jr. | B65G 41/002 |
| | | | | | 414/523 |
| 4,398,859 | A | * | 8/1983 | Ball | B60P 1/36 |
| | | | | | 414/523 |
| 4,781,513 | A | * | 11/1988 | Sjogren | E01C 19/185 |
| | | | | | 414/505 |
| 5,190,432 | A | * | 3/1993 | Gerow | B60P 1/16 |
| | | | | | 198/317 |
| 6,464,426 | B1 | * | 10/2002 | Girouard | B60P 1/36 |
| | | | | | 414/504 |
| 6,845,859 | B2 | * | 1/2005 | Grundl | E01C 19/48 |
| | | | | | 198/302 |
| 7,296,676 | B2 | * | 11/2007 | Smith | B65G 41/002 |
| | | | | | 198/313 |

(Continued)

*Primary Examiner* — James Keenan
(74) *Attorney, Agent, or Firm* — Klarquist Sparkman, LLP (57) ABSTRACT

In one representative embodiment, a vehicle has a frame, a material hopper mounted on the frame, a swing arm assembly coupled to the frame, and a conveyor mounted on the swing arm assembly. The swing arm assembly can have a support bracket configured to pivot relative to the hopper about a vertical pivot axis, the support bracket also configured to pivot relative to the hopper about a horizontal pivot axis, wherein the support bracket is configured to support the conveyor for pivoting movement of the conveyor relative to the hopper about the vertical pivot axis and about the horizontal pivot axis to move the conveyor from a first, stowed position extending alongside one of the sides of the hopper to a second, use position extending rearwardly away from the rear end of the hopper.

10 Claims, 12 Drawing Sheets

(56) References Cited

U.S. PATENT DOCUMENTS

| | | |
|---|---|---|
| 7,350,818 B2 | 4/2008 | Rini et al. |
| 7,726,904 B2 | 6/2010 | Looney |
| 8,100,220 B2 * | 1/2012 | Rexius .................... B62D 5/06 |
| | | 180/417 |
| 8,696,296 B2 * | 4/2014 | Claussen .............. B65G 41/005 |
| | | 198/317 |
| 10,035,446 B2 * | 7/2018 | Szentimrey ............... B60P 1/38 |
| 10,150,660 B2 * | 12/2018 | Koppelaar ................ B60P 1/36 |
| 2006/0239806 A1 * | 10/2006 | Yelton ....................... B60P 1/36 |
| | | 414/502 |
| 2009/0010743 A1 | 1/2009 | Wilz |

* cited by examiner

TRUCK AND CONVEYOR SYSTEM

CROSS-REFERENCE TO RELATED APPLICATION

The present application claims the benefit of U.S. Provisional Application No. 62/467,706, filed Mar. 6, 2017, which is incorporated herein by reference.

FIELD

The present disclosure concerns embodiments of a vehicle comprising a conveyor for dispensing material.

BACKGROUND

Dump trucks often carry particulate aggregate material such as sand, gravel, dirt, grain, and the like. Dump trucks usually have a large rectangular bin, or hopper, pivotally coupled to the chassis or frame of the dump truck. The forward end of the hopper can be raised to tip the hopper and discharge, or dump the contents of the hopper out of the rear tailgate of the hopper. Unloading the contents of the hopper in this manner is usually a quick way to empty the contents of the hopper. Unloading the entire load of the dump truck in this way is not always desirable because it deposits the load of the dump truck in only one location at the back of the truck. Additionally, dump trucks are often unable to deposit their loads exactly where they are needed because of obstacles between the roadway and the desired dump site. In these cases, the load must often be manually moved from the dump location to where it is needed.

To solve this problem, special conveyors called "slingers" have been coupled to hoppers of dump trucks. A slinger includes a conveyor that can be attached to receive the aggregate material gravity fed from an outlet of the hopper and convey the material to a location that is remote from the dump truck. Slingers can be mounted on a pivot assembly that can move or pivot the conveyor from a stowed position along one side of the truck for transport to a use position extending from the rear of the truck for dispensing material stored in the hopper. For certain types of truck and/or conveyor designs, a conventional pivot assembly cannot be used without substantial modification of the vehicle. For example, in some cases, the hopper must be mounted on actuators that can raise the rear of the hopper to a position above the input end of the conveyor for use and to lower the rear of the hopper in order to lower the center of gravity of the truck for driving the truck. As can be appreciated, such a design adds significant cost to the truck. What is needed is a slinger that can be safely stored along one side of the vehicle for transport and then moved to a use position behind the vehicle with the input end of the conveyor below the discharge opening of the hopper for dispensing material without having to raise and lower the rear of the hopper.

SUMMARY

In one representative embodiment, a vehicle comprises a frame, a material hopper mounted on the frame, a swing arm assembly coupled to the frame or the hopper, and a conveyor mounted on the swing arm assembly. The hopper can have first and second longitudinally extending sides and front and rear ends, the hopper also having a length extending from the rear end to the front end and parallel to the sides. The swing arm assembly can comprise a support bracket configured to pivot relative to the hopper about a vertical pivot axis, the support bracket also configured to pivot relative to the hopper about a horizontal pivot axis, wherein the support bracket is configured to support the conveyor for pivoting movement of the conveyor relative to the hopper about the vertical pivot axis and about the horizontal pivot axis to move the conveyor from a first, stowed position extending alongside one of the sides of the hopper to a second, use position extending rearwardly away from the rear end of the hopper.

In some embodiments, the vehicle further comprises a first actuator configured to cause pivoting movement of the support bracket and the conveyor about the vertical pivot axis. In some embodiments, the vehicle can also comprise a second actuator configured to cause pivoting movement of the support bracket and the conveyor about the horizontal pivot axis.

In some embodiments, the swing arm assembly further comprises a first mounting bracket fixedly mounted to the frame or the hopper and a second mounting bracket pivotably connected to the first mounting bracket and being pivotable relative to the first mounting bracket about the vertical pivot axis, and wherein the support bracket is pivotably connected to the second mounting bracket and is pivotable relative to the second mounting bracket about the horizontal pivot axis.

In some embodiments, the conveyor has an input end portion and an output end portion, the input end portion being pivotably mounted on the support bracket such that the conveyor can pivot relative to the support bracket about another horizontal pivot axis to raise and lower the output end portion relative to the hopper.

In some embodiments, the input end portion is supported on the support bracket such that the conveyor can pivot relative to the support bracket about another vertical pivot axis to pivot the output end portion of the conveyor from side-to-side.

In some embodiments, the hopper has a horizontal footprint defined by the first and second sides and the front and rear ends, and the conveyor is substantially within the horizontal footprint when the conveyor is within the stowed position.

In some embodiment, when the conveyor is in the stowed position, an input end portion of the conveyor is at or above a discharge opening at the rear end of the hopper, and when the conveyor is in the use position, the input end portion of the conveyor is below the discharge opening of the hopper.

In some embodiments, when the conveyor is in the stowed position, the conveyor is tilted about a horizontal axis extending the length of the conveyor such that an upper surface of the conveyor is tilted relative to a horizontal plane toward an adjacent side of the hopper.

In some embodiments, the conveyor is supported by the support bracket such that when the conveyor is moved from the stowed position to the use position, the conveyor is lowered as the support bracket is pivoted relative to the horizontal pivot axis.

In another representative embodiment, a vehicle comprises a material hopper having first and second longitudinally extending sides and front and rear ends, the hopper having a length extending from the rear end to the front end and parallel to the sides. A conveyor is movable between a first, stowed position extending alongside one of the sides of the hopper to a second, use position extending rearwardly away from the rear end of the hopper. A swing arm assembly supports the conveyor and is configured to lower the conveyor about a horizontal pivot axis and move the conveyor rearwardly about a vertical pivot axis when the conveyor is moved from the stowed position to the use position.

In some embodiments, the swing arm assembly comprises a support bracket having first and second end portions, the first end portion mounted for pivoting movement relative to the hopper, the second end portion supporting an input end portion of the conveyor, wherein the support bracket is pivotable about the horizontal pivot axis and the vertical pivot axis to move the conveyor from the stowed position to the use position.

In some embodiments, the swing arm assembly further comprises a first mounting bracket fixedly mounted to a frame of the vehicle or the hopper and a second mounting bracket pivotably connected to the first mounting bracket and being pivotable relative to the first mounting bracket about the vertical pivot axis, and wherein the support bracket is pivotably connected to the second mounting bracket and is pivotable relative to the second mounting bracket about the horizontal pivot axis.

In some embodiments, a first actuator is configured to produce pivoting movement of the second mounting bracket and the support bracket relative to the frame about the vertical pivot axis. In some embodiments, a second actuator is configured to produce pivoting movement of the support bracket relative to the first and second mounting brackets and the frame about the horizontal pivot axis.

In some embodiments, the input end portion of the conveyor is pivotably mounted on the second end portion of the support bracket such that the conveyor can pivot relative to the support bracket about another horizontal pivot axis to raise and lower an output end portion of the conveyor relative to the hopper.

In some embodiments, the input end portion is supported on the support bracket such that the conveyor can pivot relative to the support bracket about another vertical pivot axis to pivot the output end portion of the conveyor from side-to-side.

In some embodiments, when the conveyor is in the stowed position, the conveyor is tilted about a horizontal axis extending the length of the conveyor such that an upper surface of the conveyor is tilted relative to a horizontal plane toward an adjacent side of the hopper.

In some embodiments, the hopper has a horizontal footprint defined by the first and second sides and the front and rear ends, and the conveyor is entirely within the horizontal footprint when the conveyor is within the stowed position.

In another representative embodiment, a vehicle comprises a frame and a material hopper mounted on the frame. The hopper has first and second longitudinally extending sides and front and rear ends, and a length extending from the rear end to the front end and parallel to the sides. A conveyor is movable between a first, stowed position extending alongside one of the sides of the hopper to a second, use position extending rearwardly away from the rear end of the hopper. A swing arm assembly supports the conveyor and is configured to lower the conveyor about a horizontal pivot axis and move the conveyor rearwardly about a vertical pivot axis when the conveyor is moved from the stowed position to the use position. The swing arm assembly can comprise a support bracket having first and second end portions, a first mounting bracket fixedly mounted to the frame or the hopper and a second mounting bracket pivotably connected to the first mounting bracket and being pivotable relative to the first mounting bracket about the vertical pivot axis. The first end portion of the support bracket can be pivotably connected to the second mounting bracket and pivotable relative to the second mounting bracket about the horizontal pivot axis. The second end portion of the support bracket can support an input end portion of the conveyor. The vehicle can further comprise first and second actuators. The first actuator is configured to produce pivoting movement of the second mounting bracket and the support bracket relative to the frame about the vertical pivot axis. The second actuator is configured to produce pivoting movement of the support bracket relative to the first and second mounting brackets and the frame about the horizontal pivot axis. The input end portion of the conveyor can be pivotably mounted on the second end portion of the support bracket such that the conveyor can pivot relative to the support bracket about another horizontal pivot axis to raise and lower an output end portion of the conveyor relative to the hopper. The input end portion also can be supported on the support bracket such that the conveyor can pivot relative to the support bracket about another vertical pivot axis to pivot the output end portion of the conveyor from side-to-side.

The foregoing and other objects, features, and advantages of the invention will become more apparent from the following detailed description, which proceeds with reference to the accompanying figures.

DETAILED DESCRIPTION

For purposes of this description, certain aspects, advantages, and novel features of the embodiments of this disclosure are described herein. Features, integers, characteristics, compounds, chemical moieties or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B", "C", "A and B", "A and C", "B and C", or "A, B, and C."

As used herein, the term "coupled" generally means physically coupled or linked and does not exclude the presence of intermediate elements between the coupled items absent specific contrary language.

Referring to the figures, there is shown a vehicle 10, according to one embodiment. As used herein, the term "vehicle" refers generally to any vehicle that has a power source (e.g., motor or engine) or a towable vehicle that is coupled to a driven vehicle for travelling from place to place. For example, a vehicle can include, for example, a truck having a driver's cab or a trailer that is connectable to a truck or other vehicle for towing the trailer.

Figure 2:
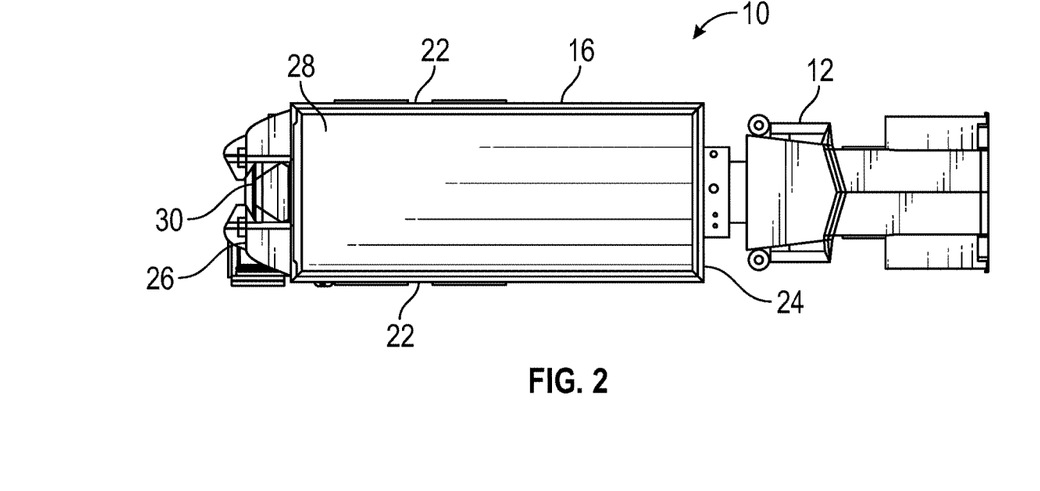
FIG. 2 is a top plan view of the vehicle of FIG. 1 with the conveyor shown in the stowed position.

The vehicle 10 in the illustrated embodiment comprises a truck having a driver's cab 12 and an integral frame 14 extending from the cab 12. In other embodiments, the frame 14 can be the frame of a trailer that is connectable to a truck or another vehicle. The vehicle 10 further comprises a material hopper, or storage bin, 16, a conveyor 18, and a swing arm assembly 20 that mounts the conveyor 18 on the vehicle. As best shown in FIG. 2, the hopper 16 in the illustrated configuration has two opposing, longitudinally extending sides 22, a front end 24, a rear end 26, a lid or roof 28, and a discharge opening 30 at the rear end for discharging material onto the conveyor 18, as further described below. The lid 28 can be removed or opened in order to introduce material into the hopper 16. The hopper 16 can be used to store and transport, for example, aggregate material, such as stone, rocks, soil, gravel, sand, grain, etc.

The conveyor 18 can have an input end portion 60 mounted on the swing arm assembly 20 and an output end portion 61 that can be moved away from the hopper 16 when dispensing material. In particular embodiments, the conveyor 18 can comprise a high-speed conveyor that can dispense material through the air from the output end portion 61 of the conveyor. For example, the conveyor can dispense material a distance of at least 70 feet from the rear of the hopper in some embodiments, at least 80 feet in some embodiments, at least 100 feet in some embodiments, or at least 140 feet in some embodiments. The conveyor 18 can be operated at belt speeds of at least about 1,500 feet per minute in some embodiments, at least about 2,000 feet per minute in some embodiments, or at least about 4,200 feet per minute or greater in some embodiments.

Figure 1:
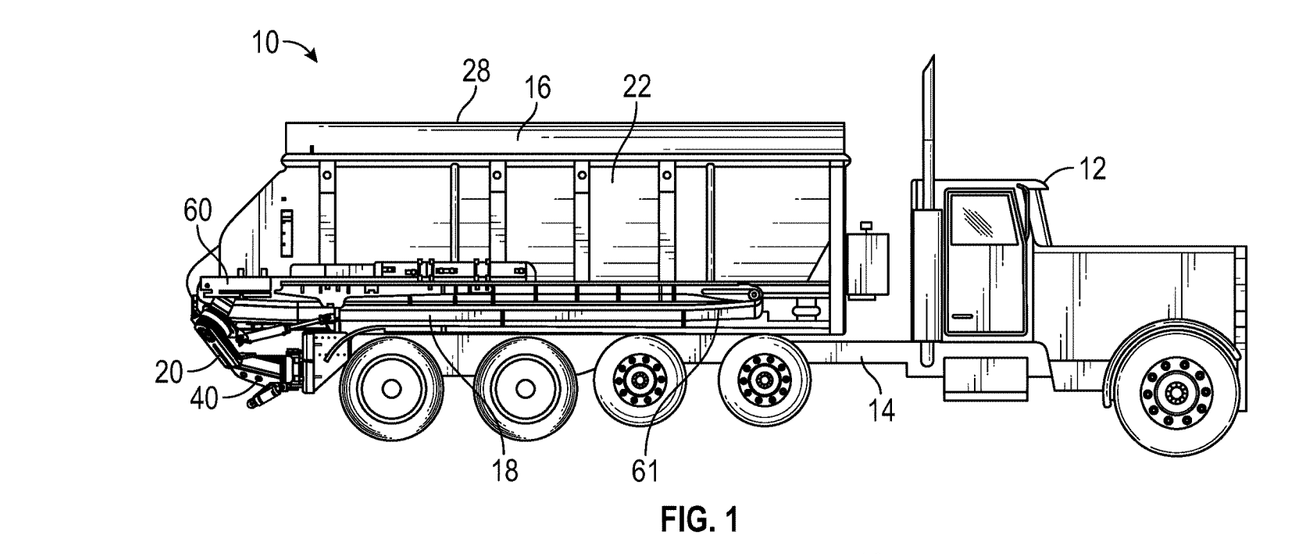
FIG. 1 is side elevation view of a vehicle having a conveyor with the conveyor shown in a stowed position for driving, according to one embodiment.
Figure 3:
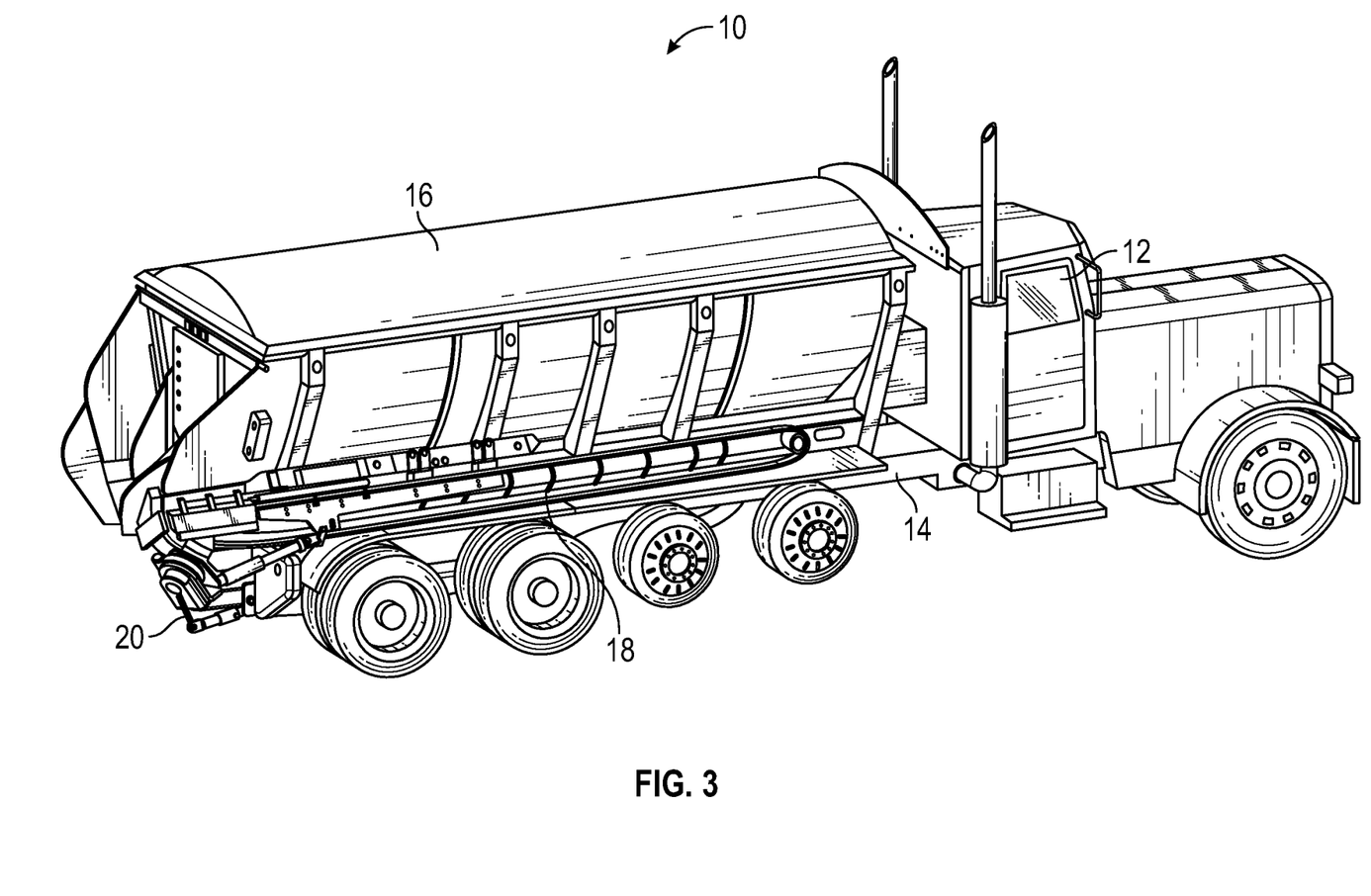
FIG. 3 is a perspective view of the vehicle of FIG. 1 with the conveyor shown in the stowed position.
Figure 4:
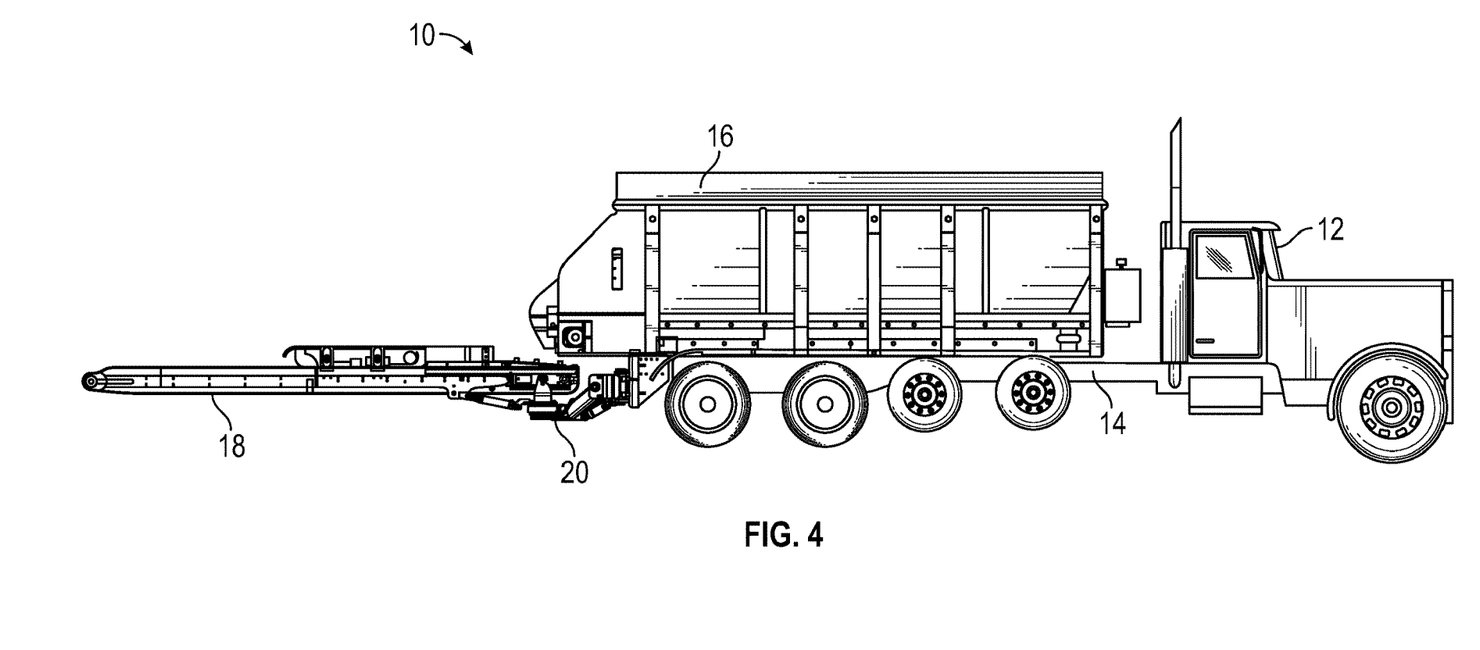
FIG. 4 is a side elevation view of the vehicle of FIG. 1 with the conveyor shown in a lowered position for use extending rearwardly from a rear end of a hopper of the vehicle.
Figure 10:
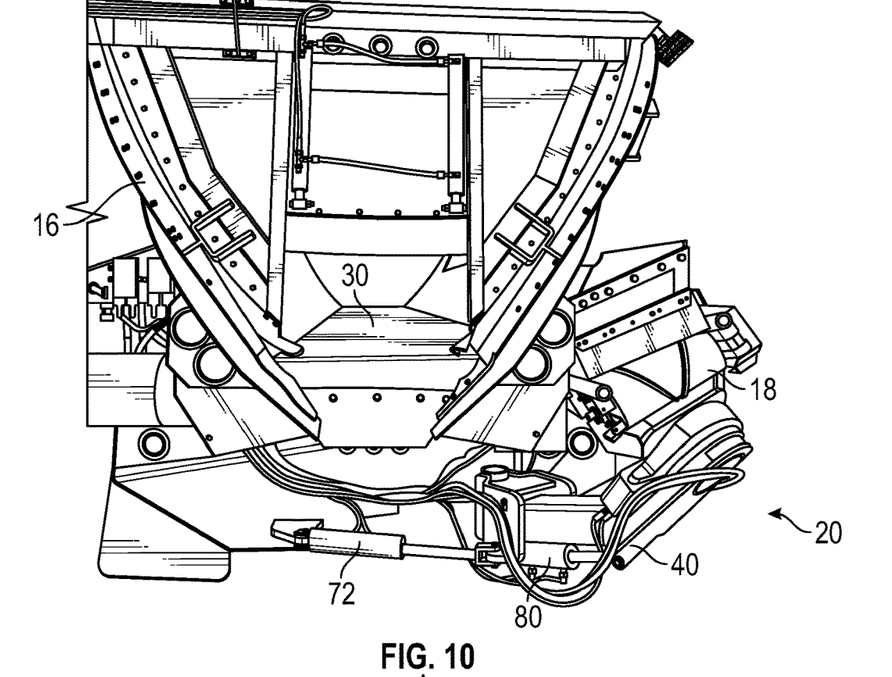
FIG. 10 is an end view of the vehicle showing the conveyor in the stowed position.
Figure 11:
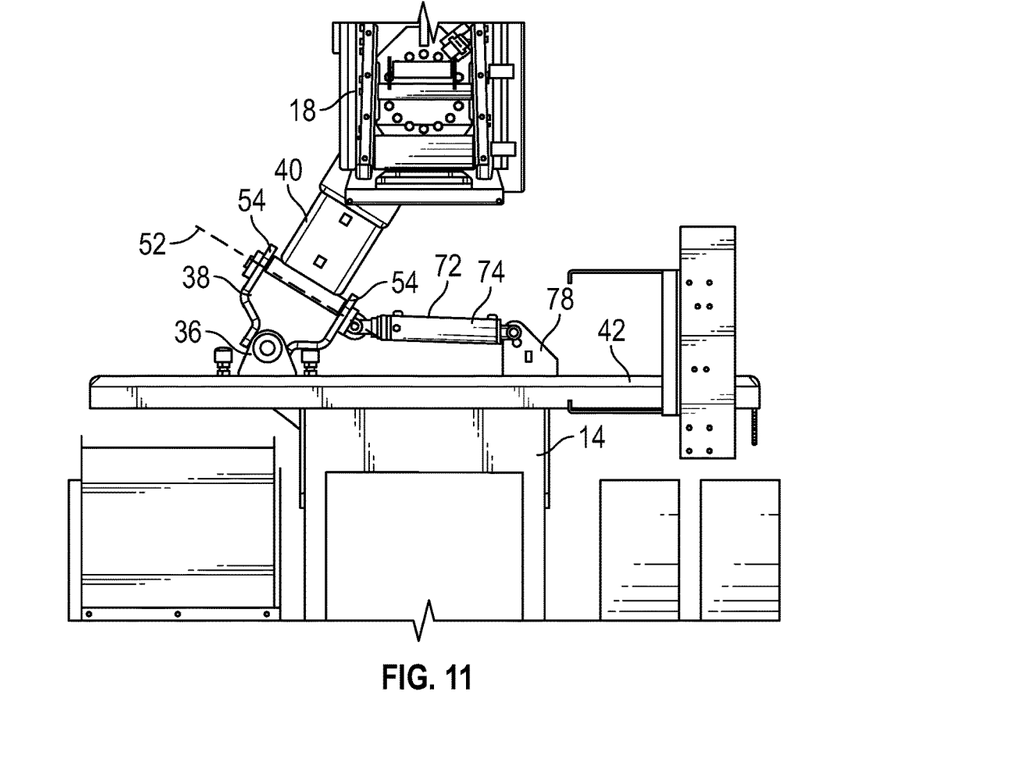
FIG. 11 is an enlarged, top view of the end portion of the vehicle showing the conveyor in the use position of FIG. 4.

The swing arm assembly 20 is configured to move the conveyor 18 from a stowed position along one side 22 of the hopper 16 when the vehicle is being driven or towed to another location (as shown in FIGS. 1-3) and to a use position (FIGS. 4-7) extending rearwardly from the rear end 26 of the hopper 16. As best shown in FIG. 10, in the illustrated configuration, when conveyor 18 is in the stowed position, the end portions 60, 61 of the conveyor are at the same height above the ground but the conveyor is tilted about a horizontal axis extending the length of the conveyor such that the upper surface of the conveyor is tilted relative to a horizontal plane toward the side 22 of the hopper 16. The swing arm assembly 20 allows the use position of the conveyor 18 to be adjusted by pivoting the conveyor side-to-side, in the directions of arrow 32 (FIG. 5), and/or by pivoting the conveyor up and down, in the directions of arrow 34 (FIG. 7), as further described below.

In particular embodiments, the swing arm assembly comprises a support bracket 40 configured to pivot relative to the hopper about a vertical pivot axis and relative to the hopper about a horizontal pivot axis, wherein the support bracket is configured to support the conveyor for pivoting movement of the conveyor relative to the hopper about the vertical pivot axis and about the horizontal pivot axis to move the conveyor from the stowed position to a use position extending rearwardly away from the rear end of the hopper.

The swing arm assembly 20 can be mounted at any convenient location relative to the hopper 16 so to allow the conveyor to be moved from the stowed position to a use position. For example, in the illustrated embodiment the swing arm assembly 20 is mounted to a rear portion of the frame 14. In other embodiments, the swing arm assembly can be mounted at other locations along the frame, on a portion of the hopper 16, or on other portions of the vehicle.

Figure 8:
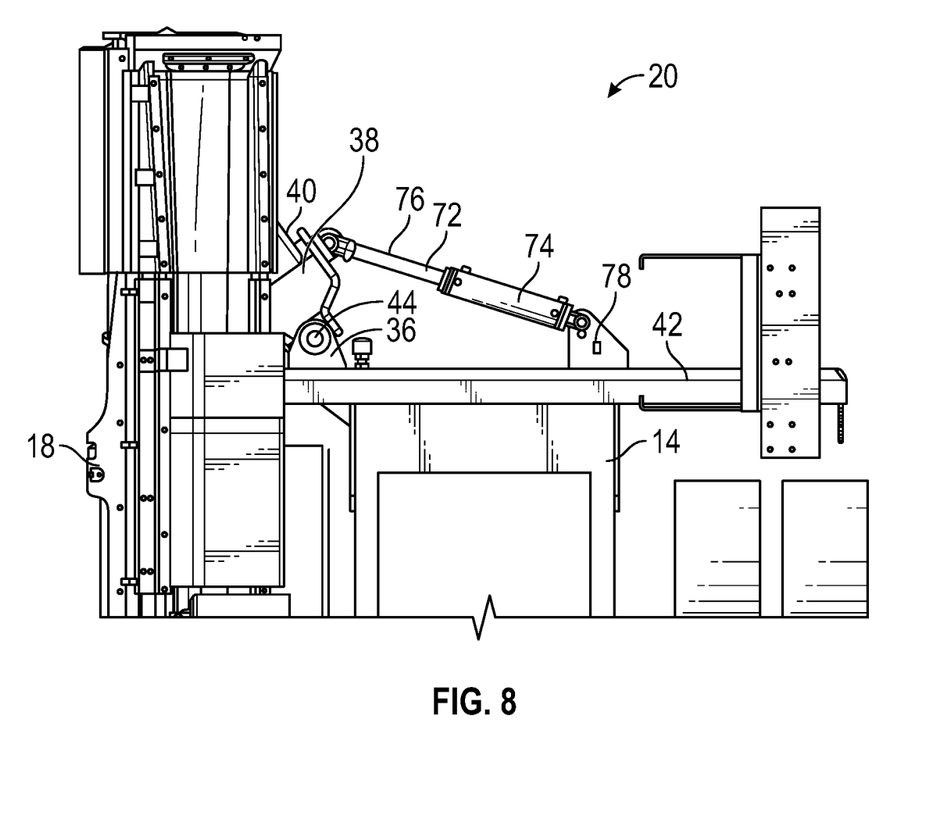
FIG. 8 is an enlarged, top view of an end portion of the vehicle showing the conveyor in the stowed position.
Figure 9:
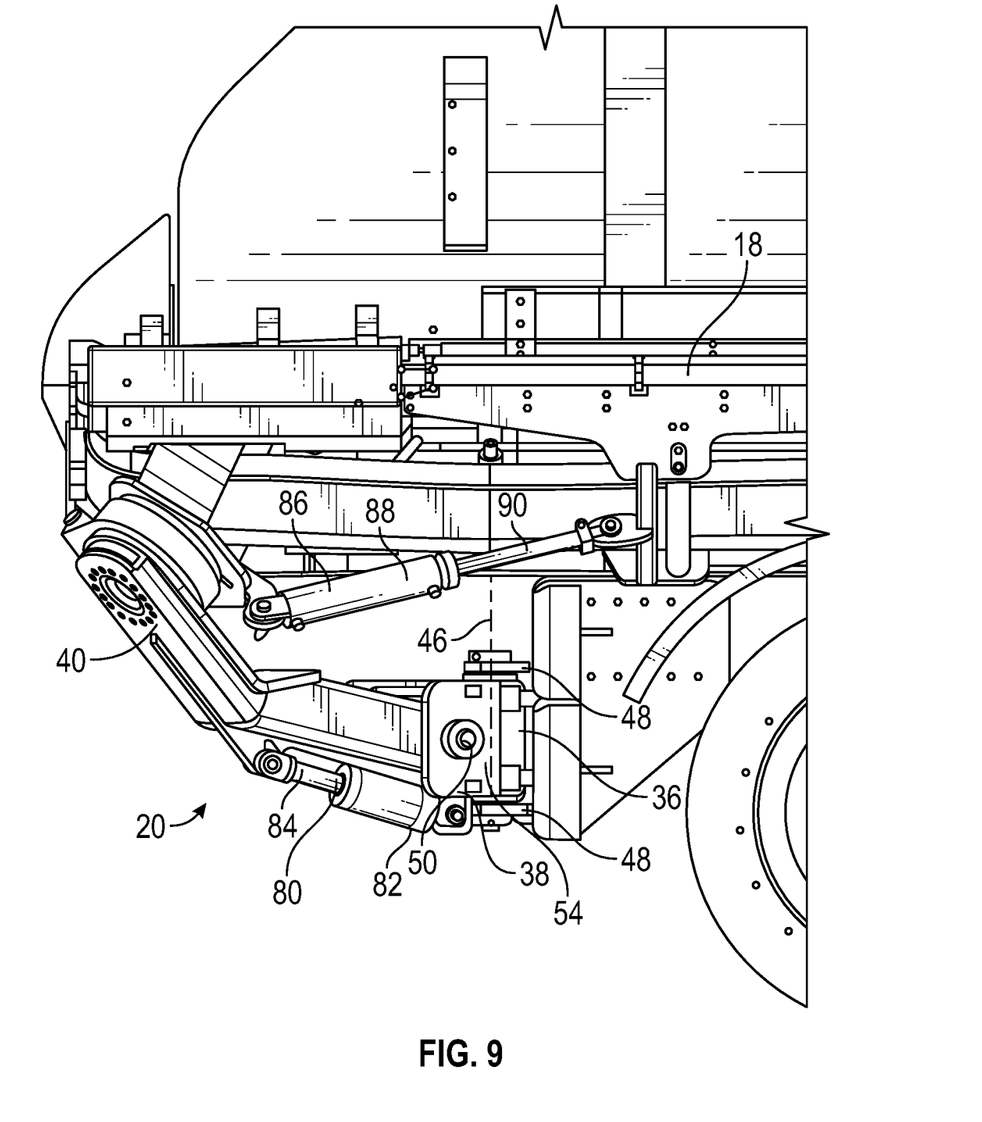
FIG. 9 is an enlarged, side view of the end portion of the vehicle showing the conveyor in the stowed position.

Referring to FIGS. 8-12, the swing arm assembly 20 in the illustrated embodiment includes a fixed mounting bracket 36 fixedly secured to the frame 14 (or at another convenient location on the vehicle, such as the hopper), an intermediate, moveable mounting bracket 38 pivotably connected to the fixed mounting bracket 36, and the support bracket 40, which is pivotably connected to the mounting bracket 38. As best shown in FIGS. 8 and 9, the fixed mounting bracket 36 can be mounted to a mounting plate 42 at the rear end of the frame 14 below the hopper 16. The mounting bracket 36 can have upper and lower ears 48 fixed to the mounted to the plate 42, and a pivot pin 44 (e.g., a bolt) defining a vertical pivot axis 46 and extending through the ears 48 and the mounting bracket 38. In this manner, the mounting bracket 38 can pivot relative to the mounting bracket 36 about the vertical pivot axis 46 (see FIG. 9).

Figure 12:
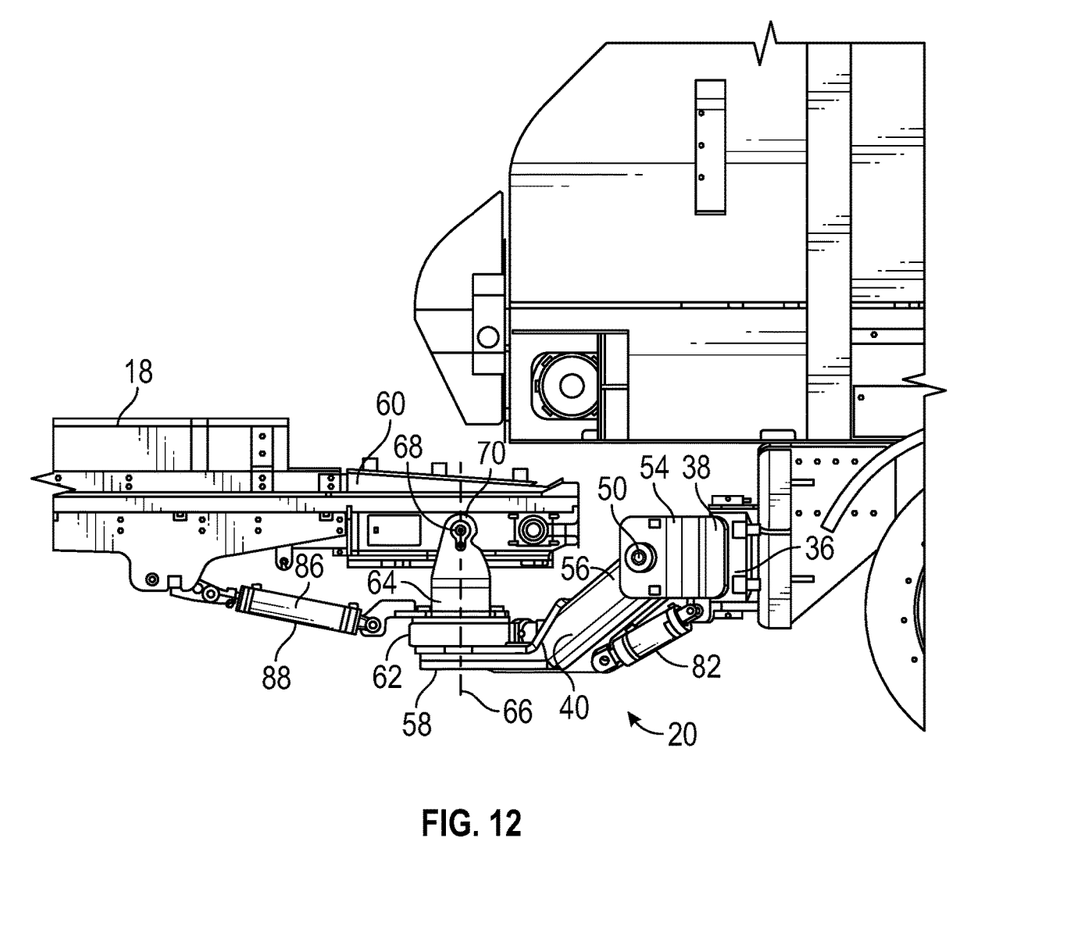
FIG. 12 is an enlarged, side view of the end portion of the vehicle showing the conveyor in the use position of FIG. 4.
Figure 13:
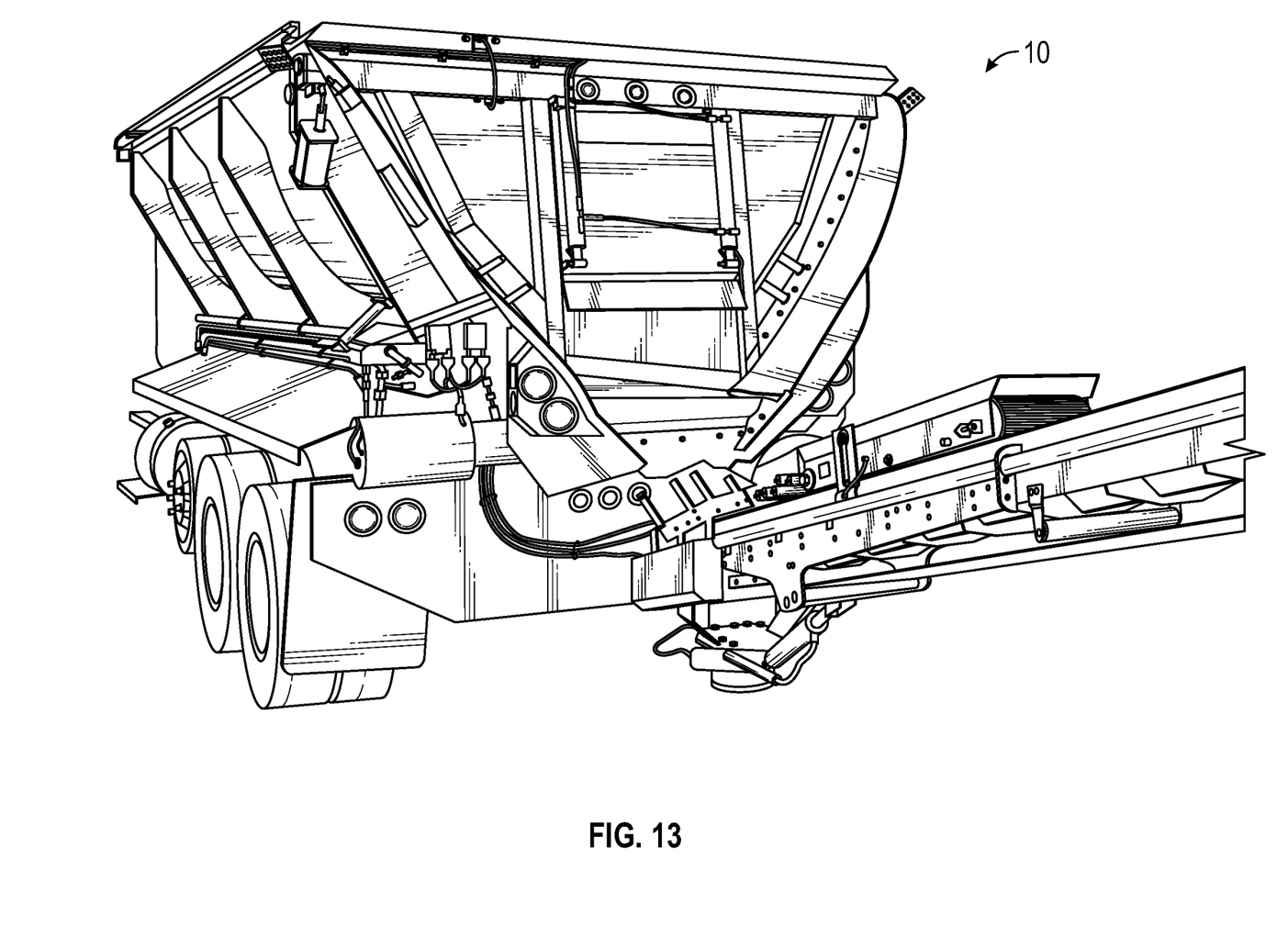
FIG. 13 is another perspective view of the vehicle showing the conveyor in a raised position for use.
Figure 14:
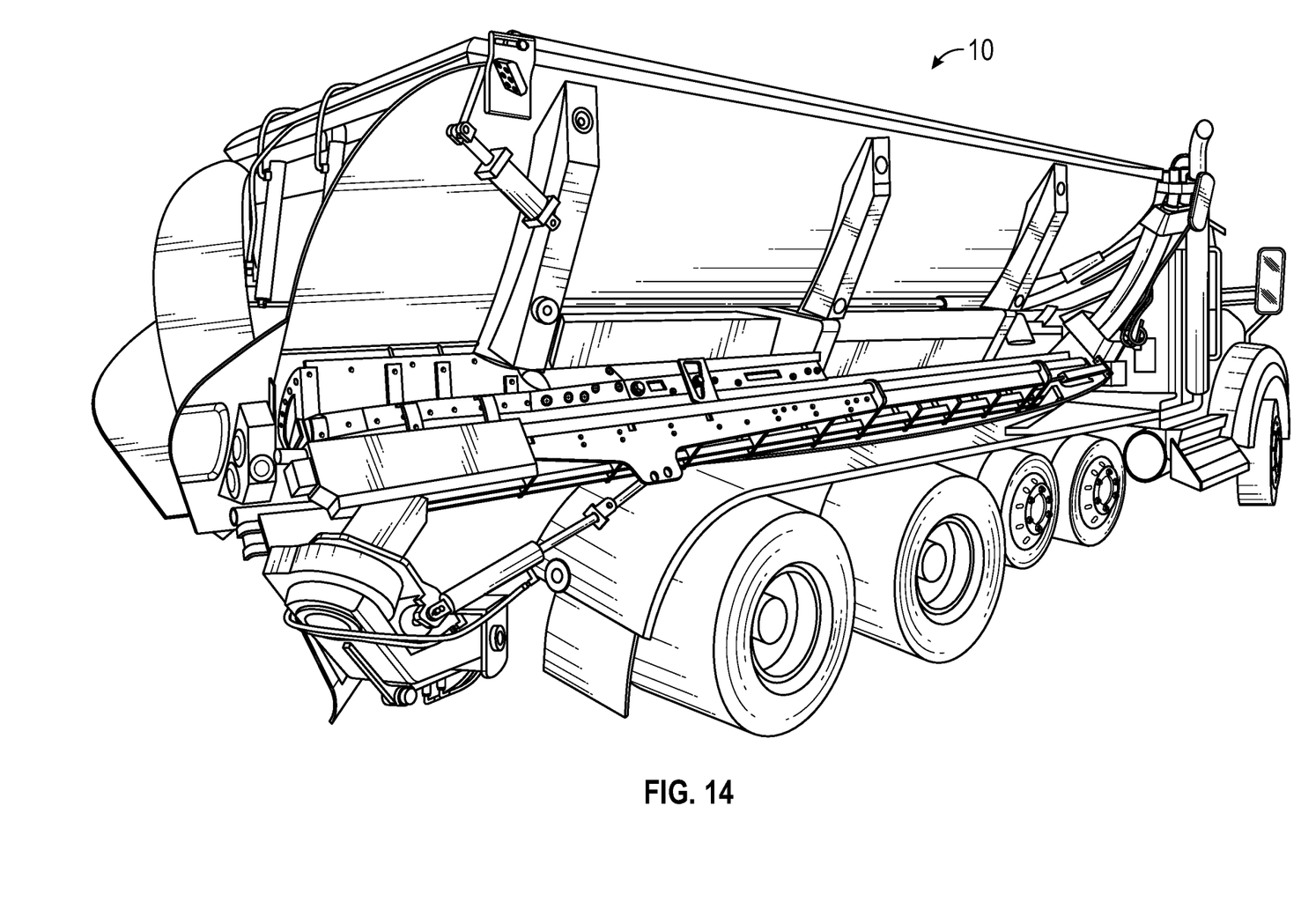
FIG. 14 is another perspective view of the vehicle showing the conveyor in the stowed position.

The mounting bracket 38 can include ears 54 and a pin 50 defining a horizontal pivot axis 52 (FIG. 11) and extending through the ears 54 and a first end portion 56 of the support bracket 40 positioned between the ears. In this manner, the support bracket 40 can pivot relative to the mounting bracket 38 about the horizontal pivot axis 52. As best shown in FIG. 12, a second end portion 58 of the support bracket 40 can support a worm gear assembly 62, which in turn can support a mounting bracket 64, which in turn can support the input end portion 60 of the conveyor 18.

Figure 5:
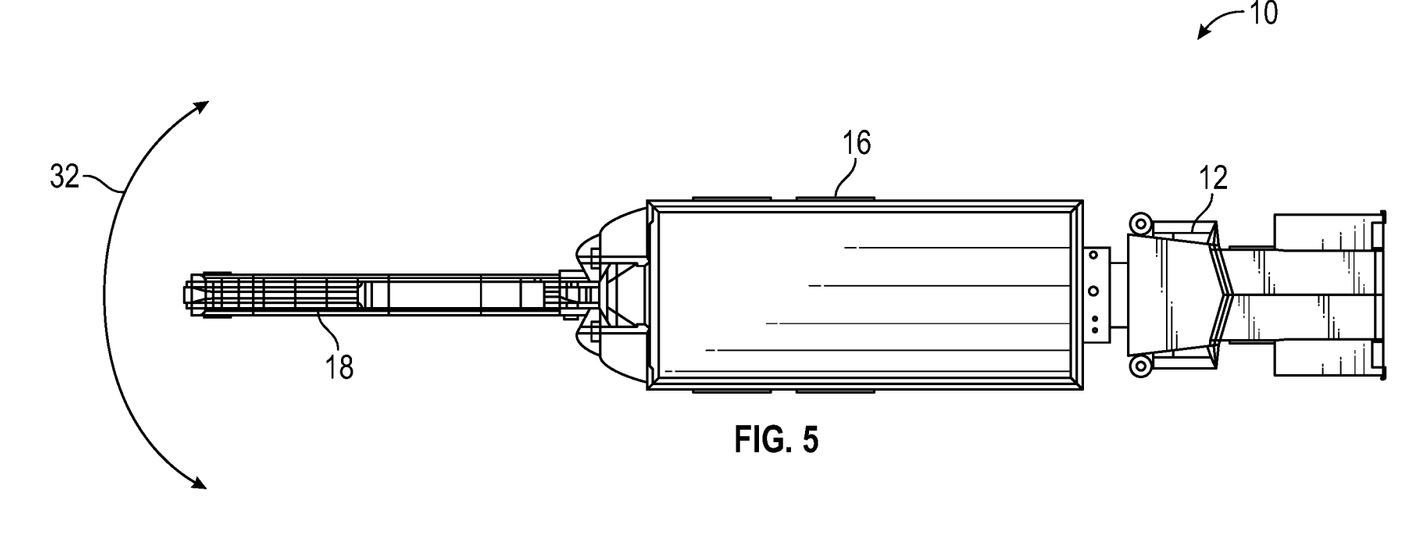
FIG. 5 is a top plan view of the vehicle with the conveyor shown in the use position of FIG. 4.
Figure 6:
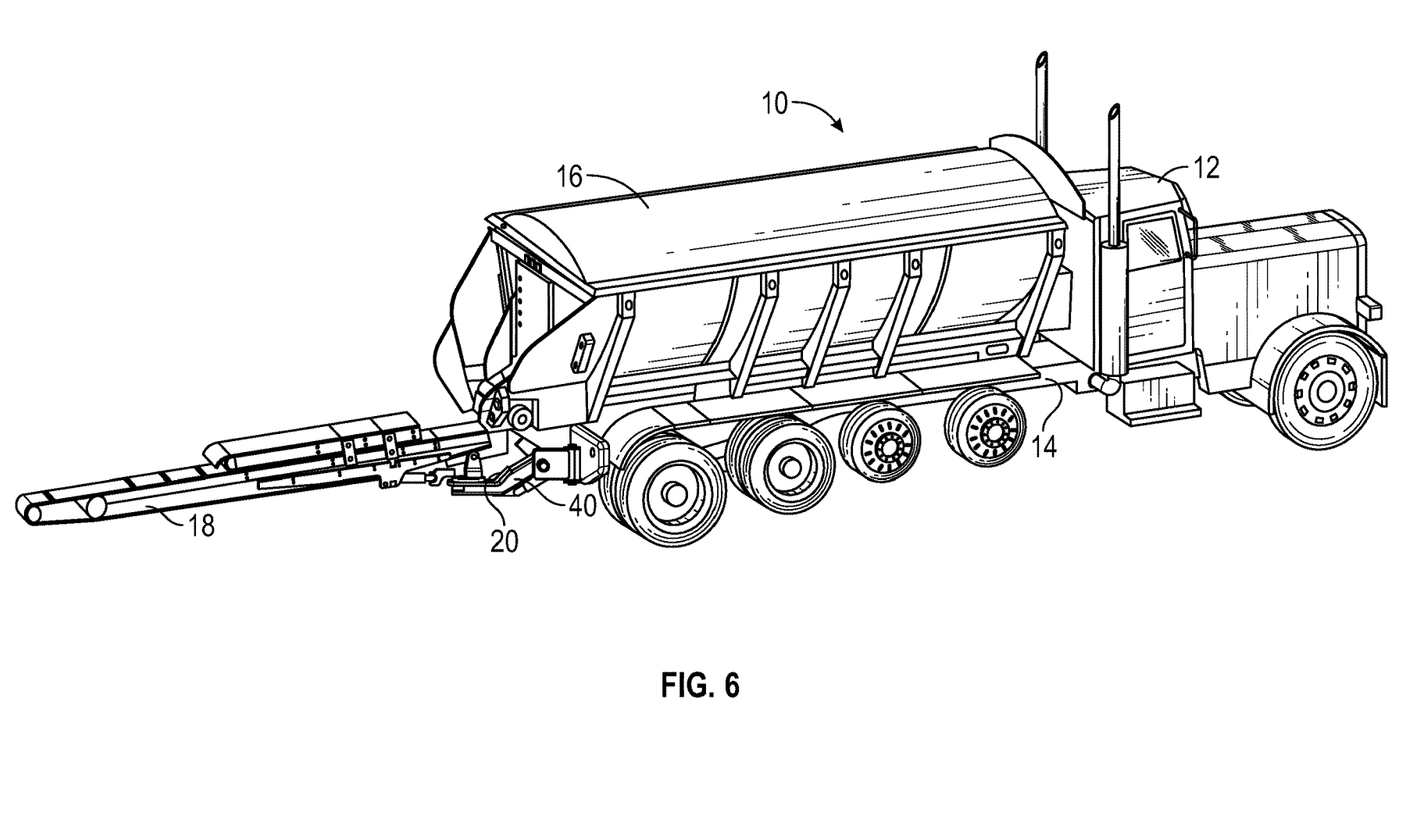
FIG. 6 is a perspective view of the vehicle of FIG. 1 with the conveyor shown in the use position of FIG. 4.
Figure 7:
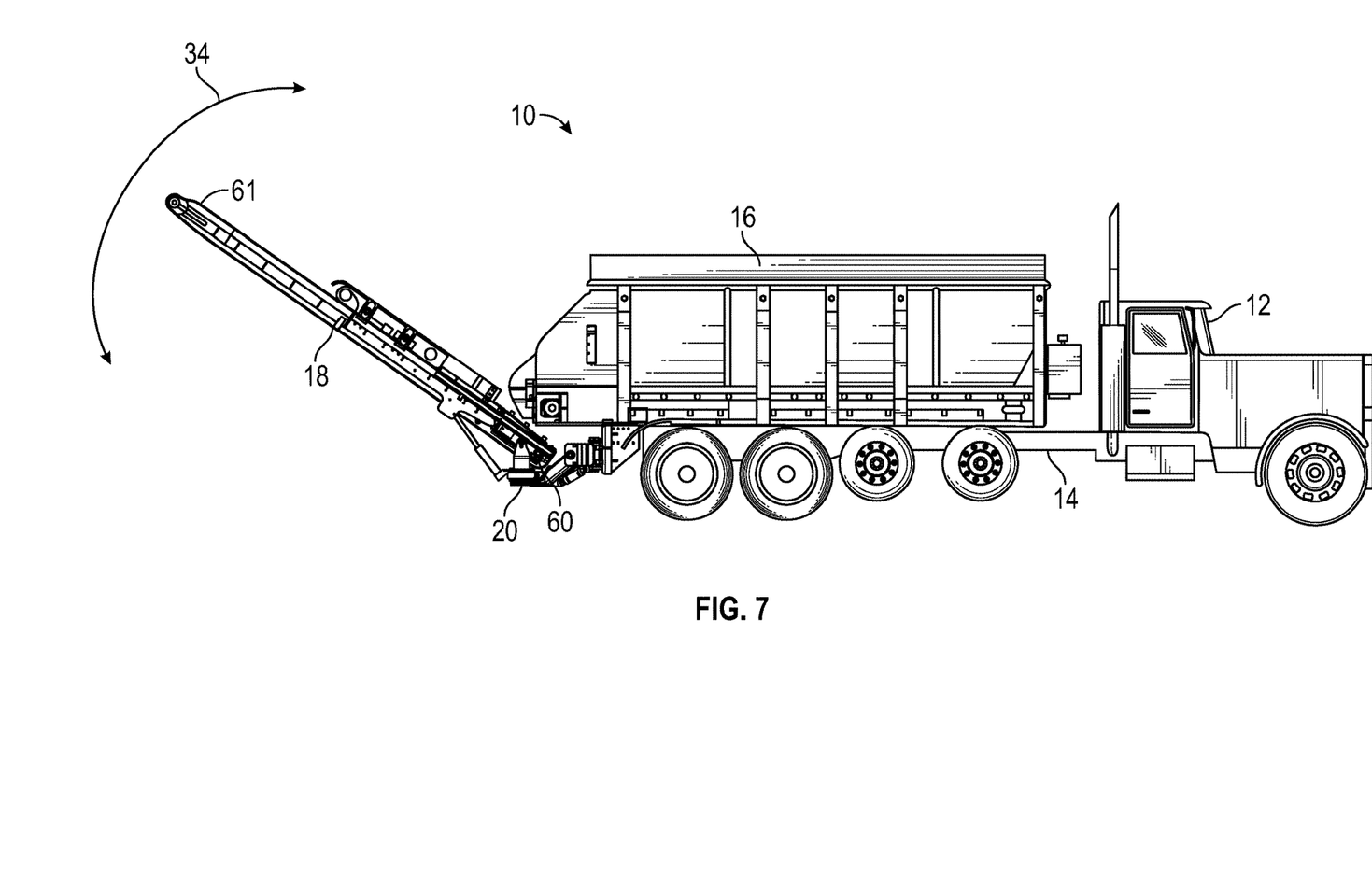
FIG. 7 is side elevation view of the vehicle of FIG. 1 with the conveyor shown in a raised position for use.

The worm gear assembly 62 is configured to pivot the mounting bracket 64 and the conveyor 18 side-to-side about a vertical pivot axis 66 in the directions of arrow 32 (FIG. 5). In alternative embodiments, other types of mechanisms, such as a swivel joint, can be used to support or couple the conveyor 18 to the second end portion 58 of the support bracket 40 and allow for side-to-side pivoting movement of the conveyor about the vertical axis 66. The mounting bracket 64 can include a pivot pin 68 (e.g., a bolt) that extends through upright ears 70 of the mounting bracket and the conveyor 18, allowing the conveyor to pivot upwardly and downwardly about the horizontal pivot axis defined by the pin 68 in the directions of arrow 34 (FIG. 7).

The vehicle can include one or more actuators to produce movement of the conveyor in the directions described above. Referring again to FIG. 8, in particular embodiments, a first actuator 72 can comprise a cylinder 74 and a slidable piston 76 with the cylinder 74 pivotably connected to a bracket 78 secured to the mounting plate 42 and the piston 76 pivotably connected to the mounting bracket 38 such that movement of the piston relative to the cylinder causes pivoting movement of the mounting bracket 38, the support bracket 40, and the conveyor 18 about the vertical pivot axis 46.

As best shown in FIG. 9, a second actuator 80 can comprise a cylinder 82 and a slidable piston 84 with the cylinder 82 pivotably connected to the mounting bracket 38 and the piston 84 pivotably connected to the support bracket 40 such that movement of the piston 84 relative to the cylinder 82 causes pivoting movement of the support bracket 40 and the conveyor 18 about the horizontal pivot axis 52. A third actuator 86 can comprise a cylinder 88 and a slidable piston 90 with the cylinder 88 pivotably connected to the bracket 64 and the piston 90 pivotably connected to the input end portion 60 of the conveyor such that movement of the piston 90 relative to the cylinder 88 causes pivoting movement of the conveyor 18 about the horizontal pivot axis defined by the pin 68.

The actuators 72, 80, and 86 can be, for example, hydraulically, pneumatically or electrically powered. The worm gear assembly 62 similarly can be hydraulically, pneumatically or electrically powered. Various other types of actuators, such as electric motors, also can be used to produce movement of the conveyor 18, the bracket 38, and the bracket 40 in the directions described above.

When the vehicle 10 is being driven, the conveyor 18 can be positioned in a tilted position along one side of the hopper 18 at a height relative to the ground such that the overall center of gravity of the vehicle is low enough that the weight of the conveyor does not affect normal operation of the vehicle. As shown in FIG. 1, the conveyor 18 in the stowed position desirably is positioned just above the frame 14 immediately adjacent the bottom of the hopper 16. The input end portion 60 can be at or above the discharge opening 30 of the hopper when the conveyor is in the stowed position. In certain embodiments, as shown in FIG. 2, the conveyor 18 is entirely or substantially within the horizontal footprint of the hopper and does not extend laterally beyond the adjacent side 22 of the hopper 16 when the conveyor is in the stowed position.

To move the conveyor 18 to a use position behind the vehicle, the second actuator 80 can be actuated to lower the input end portion 60 of the conveyor to a position below the discharge opening 30 of the hopper 16 and the first actuator 72 can be actuated to pivot the conveyor behind the hopper 16 (FIG. 5). The first and second actuators 72, 80 can be operated simultaneously, or sequentially (the first actuator 72 and then the second actuator 80, or vice versa) to move the conveyor from the stowed position to a use position behind the hopper. In the use position shown in FIG. 5, material in the hopper 16 can be dispensed from the discharge opening 30 onto the input end of the conveyor 18, which then conveys the material along the length of the conveyor and throws or "slings" the material off of the output end portion 61 of the conveyor 18. As discussed above, the output end portion of the conveyor 18 can be moved side-to-side or up and down during use to deposit the material at a desired location.

Mounting the conveyor 18 on the vehicle via the swing arm assembly 20 as described herein is particularly advantageous for vehicle and conveyors designs for which a conventional pivot assembly cannot be used because, for example, the discharge opening of the hopper is too low to the ground, or the conveyor and/or the vehicle is too wide to permit the conveyor to be stowed alongside the hopper in a horizontal position.

The swing arm assembly 20 need not be limited to movement relative to a horizontal pivot axis and a vertical pivot axis for the purpose of moving the conveyor 18 from the stowed position to the use position. As such, in alternative embodiments, the swing arm assembly can produce other movements of the conveyor as it is moved from the stowed position to the use position. For example, the swing arm assembly can pivot the conveyor relative to additional pivot axes, or it can translate the conveyor in one or more directions (e.g., up or down or side-to-side).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A vehicle comprising:
   a frame;
   a material hopper mounted on the frame, the hopper having first and second longitudinally extending sides and front and rear ends, the hopper having a length extending from the rear end to the front end and parallel to the sides;
   a swing arm assembly coupled to the frame or the hopper, the swing arm assembly having a first mounting bracket fixedly mounted to the frame or the hopper, a second mounting bracket pivotably connected to the first mounting bracket and being pivotable relative to the first mounting bracket about a vertical pivot axis, and a support bracket being pivotably connected to the second mounting bracket and pivotable relative to the second mounting bracket about a horizontal pivot axis which is horizontally offset from the vertical pivot axis and the first mounting bracket; and
   a conveyor mounted on the swing arm assembly;
   wherein the support bracket is configured to pivot with the second mounting bracket relative to the hopper about the vertical pivot axis, the support bracket also configured to pivot relative to the hopper, the first mounting bracket, and the second mounting bracket about the horizontal pivot axis, wherein the support bracket is configured to support the conveyor for pivoting movement of the conveyor relative to the hopper about the vertical pivot axis and about the horizontal pivot axis to move the conveyor from a first, stowed position extending alongside one of the sides of the hopper to a second, use position extending rearwardly away from the rear end of the hopper;

wherein the hopper is bisected by a vertical plane extending lengthwise of the hopper and the first mounting bracket is mounted to the frame or the hopper on one side of the vertical plane, wherein the stowed position is on the same side of the vertical plane as the first mounting bracket.

2. The vehicle of claim 1, further comprising a first actuator configured to cause pivoting movement of the support bracket and the conveyor about the vertical pivot axis.

3. The vehicle of claim 2, further comprising a second actuator configured to cause pivoting movement of the support bracket and the conveyor about the horizontal pivot axis.

4. The vehicle of claim 1, wherein the conveyor has an input end portion and an output end portion, the input end portion being pivotably mounted on the support bracket such that the conveyor can pivot relative to the support bracket about another horizontal pivot axis to raise and lower the output end portion relative to the hopper.

5. The vehicle of claim 4, wherein the input end portion is supported on the support bracket such that the conveyor can pivot relative to the support bracket about another vertical pivot axis to pivot the output end portion of the conveyor from side-to-side.

6. The vehicle of claim 1, wherein the hopper has a horizontal footprint defined by the first and second sides and the front and rear ends, and the conveyor is substantially within the horizontal footprint when the conveyor is within the stowed position.

7. The vehicle of claim 1, wherein when the conveyor is moved to the stowed position, an input end portion of the conveyor is moved to a location at or above a height of a discharge opening at the rear end of the hopper, and when the conveyor is moved to the use position, the input end portion of the conveyor is moved to a location below the height of the discharge opening of the hopper.

8. The vehicle of claim 1, wherein when the conveyor is moved to the stowed position, the conveyor becomes tilted about a horizontal axis extending the length of the conveyor such that an upper surface of the conveyor is tilted relative to a horizontal plane toward an adjacent side of the hopper.

9. The vehicle of claim 1, wherein the conveyor is supported by the support bracket such that when the conveyor is moved from the stowed position to the use position, the conveyor is lowered by the support bracket as it pivots relative to the horizontal pivot axis.

10. A vehicle comprising:
a frame;
a material hopper mounted on the frame, the hopper having first and second longitudinally extending sides and front and rear ends, the hopper having a length extending from the rear end to the front end and parallel to the sides;
a conveyor movable between a first, stowed position extending alongside one of the sides of the hopper to a second, use position extending rearwardly away from the rear end of the hopper; and
a swing arm assembly supporting the conveyor and configured to lower the conveyor about a horizontal pivot axis and move the conveyor rearwardly about a vertical pivot axis when the conveyor is moved from the stowed position to the use position;
wherein the swing arm assembly comprises a support bracket having first and second end portions, a first mounting bracket fixedly mounted to the frame or the hopper and a second mounting bracket pivotably connected to the first mounting bracket and being pivotable relative to the first mounting bracket about the vertical pivot axis, the first end portion of the support bracket being pivotably connected to the second mounting bracket and being pivotable relative to the second mounting bracket about the horizontal pivot axis, the second end portion of the support bracket supporting an input end portion of the conveyor;
wherein the first mounting bracket comprises an upper ear and a lower ear fixedly mounted to the frame or the hopper and a first pivot pin extending therebetween which defines the vertical pivot axis;
wherein the second mounting bracket comprises a first ear and a second ear and a second pivot pin extending therebetween which defines the horizontal pivot axis, wherein the first end portion of the support bracket is positioned between the first and second ears, and the second pivot pin extends through the first end portion of the support bracket;
a first actuator configured to produce pivoting movement of the second mounting bracket and the support bracket relative to the frame about the vertical pivot axis;
a second actuator configured to produce pivoting movement of the support bracket relative to the first and second mounting brackets and the frame about the horizontal pivot axis;
wherein the input end portion of the conveyor is pivotably mounted on the second end portion of the support bracket such that the conveyor can pivot relative to the support bracket about another horizontal pivot axis to raise and lower an output end portion of the conveyor relative to the hopper;
wherein the input end portion is supported on the support bracket such that the conveyor can pivot relative to the support bracket about another vertical pivot axis to pivot the output end portion of the conveyor from side-to-side;
wherein the hopper is bisected by a vertical plane extending lengthwise of the hopper and the first mounting bracket is mounted to the frame or the hopper on one side of the vertical plane, wherein the stowed position is on the same side of the vertical plane as the first mounting bracket; and
wherein when the conveyor is moved to the stowed position, the conveyor becomes tilted about a horizontal axis extending the length of the conveyor such that an upper surface of the conveyor is tilted relative to a horizontal plane toward an adjacent side of the hopper.

* * * * *